United States Patent [19]

Contartese et al.

[11] Patent Number: 4,513,782
[45] Date of Patent: Apr. 30, 1985

[54] ELECTROHYDRAULIC SERVOVALVE DEVICE

[75] Inventors: Giulio Contartese, Paris; Joachim Dietz, Rungis, both of France

[73] Assignees: Thomson-CSF, Paris; Moog S.A.R.L., Rungis, both of France

[21] Appl. No.: 413,551

[22] Filed: Aug. 31, 1982

[30] Foreign Application Priority Data

Sep. 11, 1981 [FR] France ............... 81 17235

[51] Int. Cl.³ .............................. G05B 5/01
[52] U.S. Cl. .................... 137/625.63; 91/361; 91/363 R; 137/625.69; 318/624
[58] Field of Search ......... 91/361, 363 A, 363 R; 318/624, 567, 632; 137/625.63, 625.64, 625.69; 364/183

[56] References Cited

U.S. PATENT DOCUMENTS

| | | | |
|---|---|---|---|
| 3,233,623 | 2/1966 | Gray | 137/625.63 |
| 3,555,969 | 1/1971 | Shah | 137/625.63 |
| 3,710,082 | 1/1973 | Sloane et al. | 364/183 |
| 3,821,625 | 6/1974 | Scholl | 318/624 |
| 3,978,668 | 9/1976 | Nonnenmacher | 60/448 |
| 4,050,476 | 9/1977 | Hayner et al. | 137/625.63 |
| 4,077,738 | 3/1978 | Keely et al. | 91/361 |
| 4,126,155 | 11/1978 | Bertram | 137/625.69 |
| 4,282,900 | 8/1981 | Lauba et al. | 137/625.3 |
| 4,337,797 | 7/1982 | Caruso | 137/625.69 |
| 4,396,975 | 8/1983 | Kurakake | 364/183 |
| 4,404,626 | 9/1983 | Aoyama | 364/183 |

FOREIGN PATENT DOCUMENTS

| | | |
|---|---|---|
| 2305014 | 10/1976 | Fed. Rep. of Germany . |
| 1332700 | 6/1962 | France . |
| 0631686 | 11/1978 | U.S.S.R. ........... 137/625.64 |

OTHER PUBLICATIONS

Regelungstechnische Praxis, vol. 20, No. 2, Feb. 1978, Munich M. Gloeckner et al.

Primary Examiner—Sheldon J. Richter
Assistant Examiner—Randolph A. Smith
Attorney, Agent, or Firm—Oblon, Fisher, Spivak, McClelland & Maier

[57] ABSTRACT

A servovalve device assembly is provided with an electronic matching circuit positioned upstream of the servovalve. The matching circuit supplies electric control signals whose purpose is to modify the hydraulic flow-rate response curve of the servovalve as a function of the electrical control signal, so as to make it substantially identical to an ideal desired response curve.

8 Claims, 7 Drawing Figures

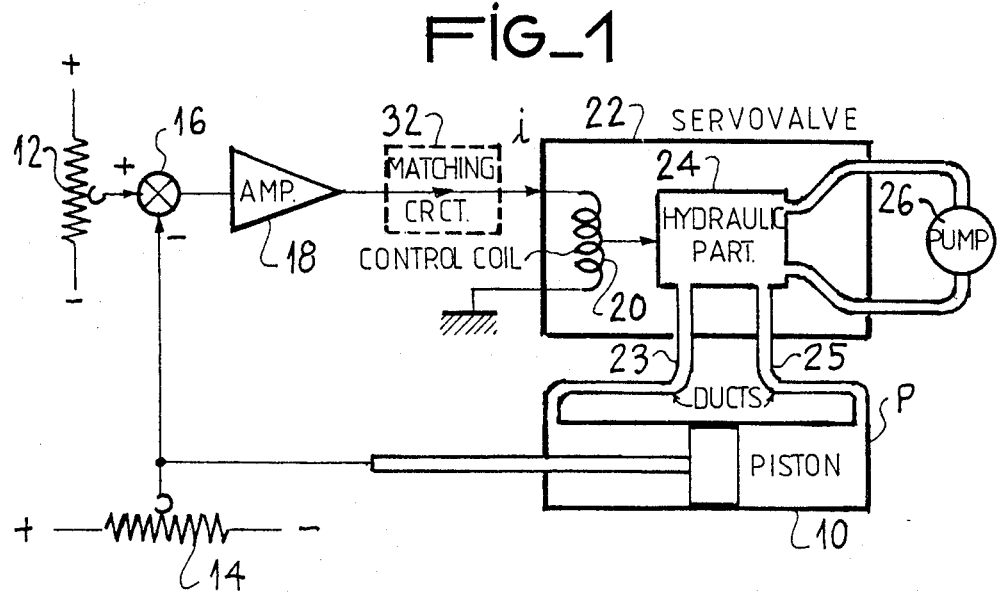
FIG_1
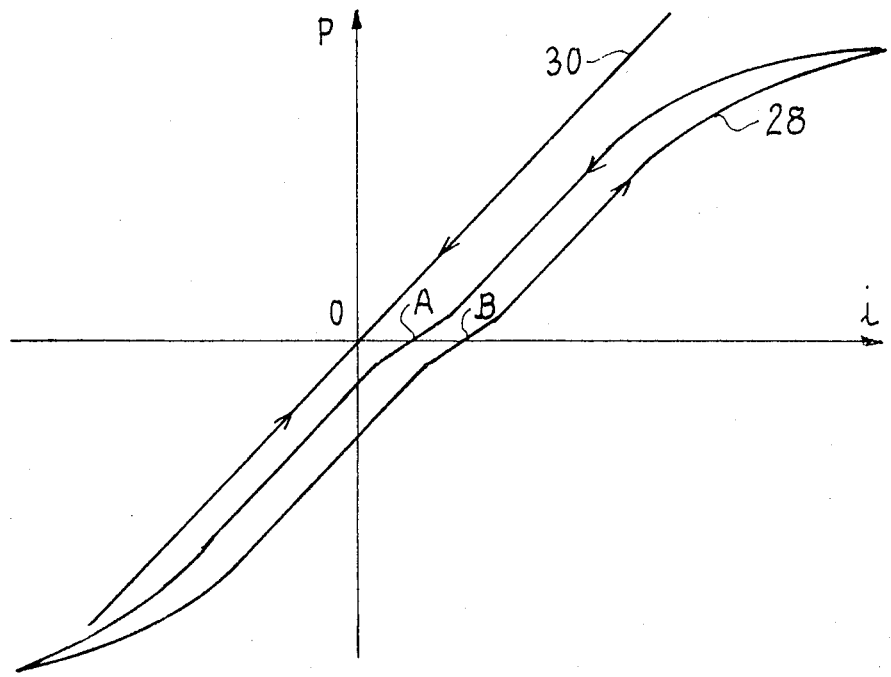
FIG_2

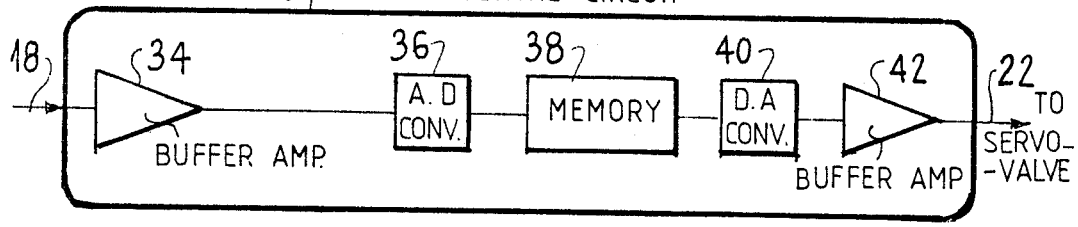
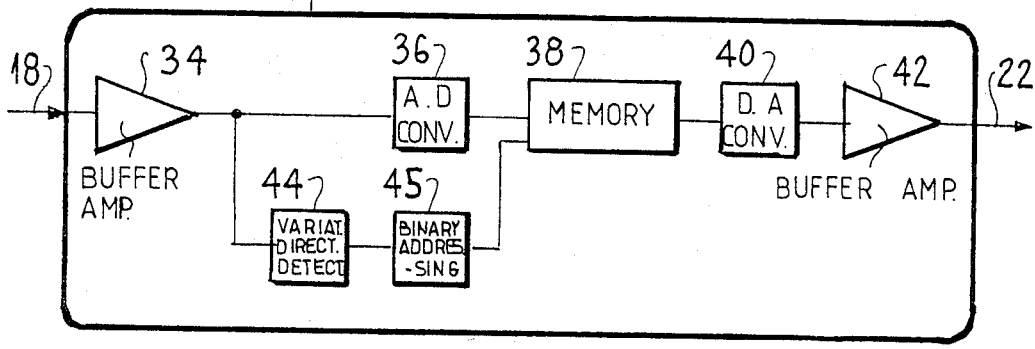
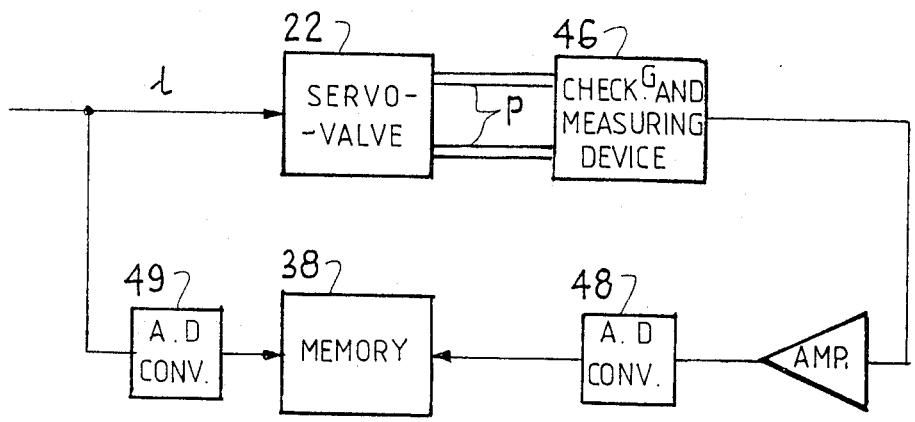

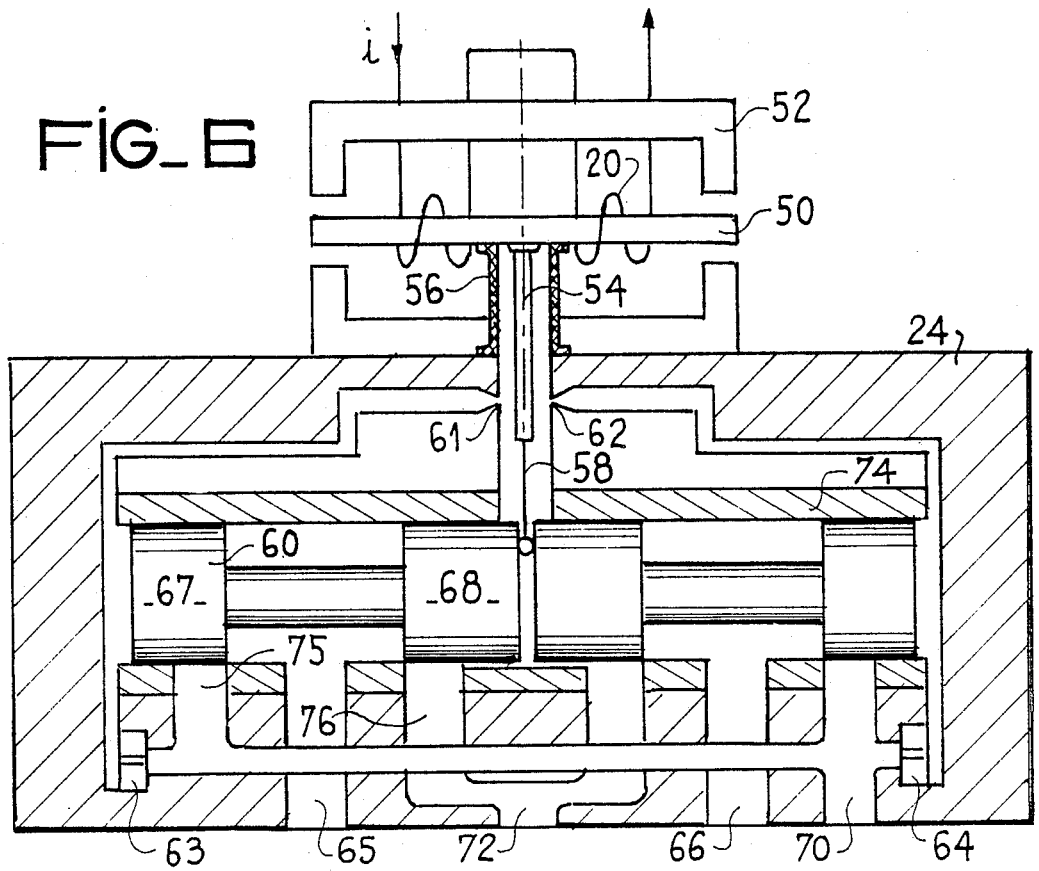
FIG_6
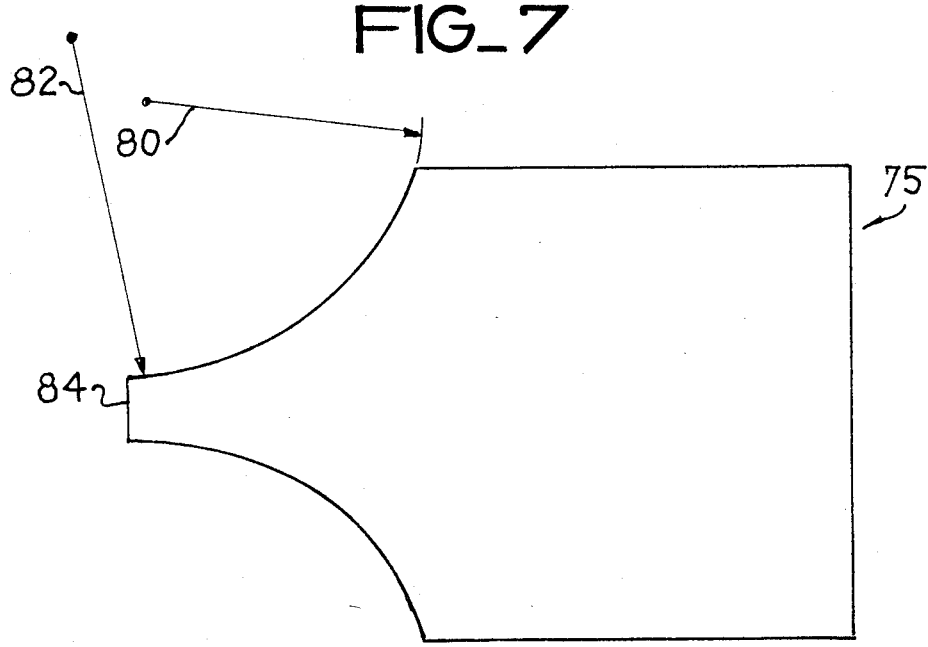
FIG_7

ELECTROHYDRAULIC SERVOVALVE DEVICE

BACKGROUND OF THE INVENTION

The present invention relates to an electrohydraulic servovalve. Generally, a servovalve belongs to the class of apparatus transforming an electric magnitude, current or voltage, into a corresponding hydraulic magnitude, i.e. a pressure or a flowrate.

Servovalves are used principally as interface elements between an electric control and a mechanical action in electrohydraulic control systems which for several years have known an increasing development. The applications thereof are not then limited to the aeronautics or armaments fields but have penetrated other fields and electrohydraulic servosystems can be found on machine tools, in metallurgy, on mobile equipment and on machines for transforming plastic materials, among others.

The servovalve, from the raw energy supplied by a hydraulic generator, restores to a power member, motor or cylinder and piston device, a part thereof in ordered form. The ratio between the electric control power and the controlled hydraulic power is currently between $10^4$ and $10^6$. In fact, with an electric signal of a few hundredths or tenths of a watt an oil flowrate of several tens, even several hundreds of kilowatts may be controlled.

For correct operation of an open or closed servocontrol loop, comprising a servovalve, it is usually desirable for the characteristic response of the servovalve to be as linear as possible. At the same time, as for any other component, attempts are made to increase the performances thereof, speed of response, output power, control fineness about the zero point etc., while reducing the charges such as energy losses, space occupancy and cost price.

Up to the present time, the linearity and the other qualities are provided by using manufacturing techniques of very high quality, even close to the presently obtainable limits. This results in high costs.

The aim of the present invention is to ensure the desired ratio between the control signal and the action which results therefrom, by using means which do not necessarily involve said very high precision manufacturing techniques.

SUMMARY OF THE INVENTION

According to the present invention, a hydraulic servovalve device in which the servovalve has an electric input for receiving an electric control magnitude and a hydraulic output delivering a hydraulic magnitude corresponding to the electric control magnitude and whose hydraulic magnitude response curve as a function of the electric magnitude deviates to a certain extent from a desired ideal response curve, said device comprising electronic means matched to the real response curve and connected between a control input of the device and the electric input properly speaking of the servovalve, said electronic means elaborating a corrected output electric magnitude (i) depending, on the one hand, on a signal and, on the other hand, on said real response curve, and acting so that the hydraulic magnitude response curve as a function of the electric control signal approximates substantially the desired ideal response.

This desired response is more generally an overall linear response, it may however be adapted to certain more localized actions, obtained by acting directly on certain constructional characteristics of the servovalve itself.

According to another characteristic of the invention the oil flow control ports in the servovalve are given a shape departing from the conventional rectangular shape, resulting, besides the overall linear control, in an exponential action as a function of the movement of the valve-spool of the servovalve.

The advantages afforded by the invention are in particular that for equal characteristics it allows servovalves to be manufactured with superior performances.

BRIEF DESCRIPTION OF THE DRAWINGS

Other advantages and features of the invention will appear from the following description of one non limiting embodiment with reference to the figures which show:

FIG. 1, a simplified diagram of a closed servocontrol loop;

FIG. 2, an ideal response curve forming the desired response as well as an actual curve with exaggerated defects obtained with a device of the prior art;

FIG. 3, a schematical diagram of a preferred simple embodiment of the electronic means in the form of an electronic matching circuit;

FIG. 4, a schematical diagram of an improvement made to FIG. 3;

FIG. 5, the construction of a memory for the electronic matching circuit;

FIG. 6, a section through a servovalve; and

FIG. 7, a top view of a non rectangular port.

DESCRIPTION OF THE PREFERRED EMBODIMENTS

FIG. 1 shows the simplified diagram of a simple closed loop servo-control system. The position of a piston 10 is controlled from a control means 12. This position is detected by a position sensor 14 and the difference between the two electric magnitudes generated by the control means 12 and sensor 14 is provided by a subtractor 16. This difference is amplified by an amplifier 18 and it is then applied to a control coil 20 of a servovalve 22. The hydraulic part 24 of this latter receives from a pump 26 hydraulic pressurized fluid and it distributes the hydraulic pressure to one or other of the faces of piston 10 through ducts 23,25 depending on the sense of said difference, and in proportions which are linked to its magnitude.

FIG. 2 shows the relationship which is established between the electric magnitude i applied to the input of coil 20 and the hydraulic magnitude p which results therefrom. Response curve 28 is obtained with a servovalve device of the prior art with however the defects shown in an exaggerated way to clarify the drawing, whereas curve 30, a straight line passing through the origin, represents a desired response curve to be obtained precisely with the device of the invention. The analysis of curve 28 reveals especially the defects of the badly placed zero points A and B of the gain which varies about zero, of the gain which varies close to the maximum and hysteresis limits.

According to the invention, these defects are palliated by inserting a so-called electronic matching circuit 32 shown with a broken line in FIG. 1, between the output of amplifier 18 and the input of the electric control signal for servovalve 22. This electric matching circuit 32, shown in more detail in FIG. 3, comprises an input buffer amplifier 34, an analog-digital converter 36, a memory 38, a digital-analog converter 40 and an output buffer amplifier 42. Memory 38 stores, for each value admitted as input signal, the corresponding value which will result in the desired hydraulic magnitude outputted by the servovalve. To effect this transformation, the input signal serves for addressing the memory and the valve stored at this address corresponds in fact to the input value.

The two converters 36 and 40 used advantageously a number of elements in common which may be used in timesharing. This is possible because of a maximum electric conversion frequency of the order of about ten kilohertz which exceeds by far the maximum hydraulic response frequency which is located round about a hundred hertz or so.

To obtain a better approximation of the ideal response curve, two sets of values are fed into the memory, one corresponding to the rising part of curve 28 and the other corresponding to the descending part. In this case, FIG. 3 is modified as shown in FIG. 4 in which a device 44 is incorporated for detecting the direction of variation of the control signal, and an additional binary addressing element 45 has been added. For example, the heavy weight bit would indicate the rising direction for its logic value 1 and the descending direction for its logic value 0.

Generally, each memory is matched to its own servovalve towards the end of manufacture thereof. So as to obtain a linear response, the operation is carried out in the following way described with reference to FIG. 5. A new servovalve 22 is installed in a checking and measuring device 46. An electric control magnitude i is applied to servovalve 22 and the hydraulic magnitude p which results therefrom is measured. After adequate conversion into a digital signal in an analog-digital converter 48, magnitude p addresses memory 38, whereas the electric control magnitude, also after adequate conversion into digital form in a converter 49, is written into the memory which is then operating in the write mode. The electric magnitude i is modified so that the hydraulic magnitude p marks each available address at the resolution used. Programmable read-only memories (PROMs) are used. In use, a control signal proportional to the desired hydraulic magnitude p is used for addressing memory 38 which therefore automatically delivers the electric magnitude i for obtaining it.

In a first general use, an electronic matching circuit in accordance with the invention serves for reducing the defects of manufacture. However, it may provide other interesting possibilities and from the simple correction of manufacturing faults attain linearization of a servovalve apparatus with non linear distribution law. Besides overall linearization of the device, it is possible in the scope of the invention to act on certain characteristics proper to the servovalve itself, which is made possible by the presence of the electronic matching circuit, and to obtain, by causing the means used to cooperate, other desirable qualities for the device.

Thus may be mentioned:

the reduction of the "drive flatness" of a hydraulic motor controlled by the servovalve, reduction of the hydraulic leaks of the servovalve, reduction of the intrinsic drift due to the distributor alone, improvement in the smoothness at low speeds of the servomotor, improvement in the capacity of the servovalve to respond to a weaker control signal and the possibility of having response performances on demand, the possibility of increasing the manufacturing tolerances for the servovalve for a given linearity, or conversely of linearizing the servovalve with tolerances imposed greater than those possible without the matching circuit, reduction of the effects of erosion.

To better understand how to obtain these results in accordance with the invention, the operation of a typical servovalve will be recalled schematically with reference to FIG. 6. Coil 20 surrounds an armature 50, the coil-armature assembly being housed in a magnetic circuit 52. An electric current i flowing through coil 20 creates a couple which tends to cause armature 50 to rock. This action drives a blade 54 which is integral with the armature, but which is plunged in an oil circuit. The possibility for blade 54 to move is provided by a flexible tube 56 which surrounds it and which provides the seal between the oil circuit and the electric circuit. Blade 54 is extended by a retroaction spring 58 whose end is engaged in a valve-spool 60.

Blade 54 is placed between two nozzles 61 and 62 which are supplied with pressurized oil through two calibrated orifices 63 and 64. The oil arrives in the body 24 of the servovalve through a pressure inlet 70 and it is discharged through return outlet 72. When blade 54 moves towards one of the nozzles, 62 for example, it moves at the same time away from the other one, causing a greater oil flow through the nozzle 61 from which it is moving away with respect to the flow through the nozzle 62 which it is approaching. The result is that the pressure increases behind the approached nozzle 62 and decreases behind the other nozzle 61; the valve-spool 60 is then subjected to a differential pressure. When the valve-spool 60 moves under the action of this pressure, it drives with it the retroaction spring 58, creating a couple opposed to the initial electromagnetic couple. At the point of equilibrium of these couples, blade 54 is again centered between the two nozzles 61 and 62 and the valve-spool stops in a position determined by the magnitude of the initial electromagnetic couple.

Valve-spool 60 is housed in a sleeve 74 which is provided with different ports 75,76 which are gradually uncovered by pistons 67,68 which form part of the valve-spool 60. Depending on the direction of movement of valve-spool 60, the ports are placed in relationship either with the pressure inlet 70 or with the return outlet 72. The ports control an oil flow through two user orifices 65 and 66.

There are then two effects: an electromagnetic couple results in movement of the valve-spool and the position of the valve-spool determines the uncovered proportion of ports, controlling the oil flow therethrough.

In fact, generally, the sleeves of the servovalves have rectangular ports resulting in linear flow laws. Around low flow rates, the parameters playing a role in the response of the servovalve are the axial and radial adjustment of the valve-spool in the sleeve and more precisely the covering and uncovering zones around the neutral point. Different leaks further add background "noise". The performances depend essentially on the machining accuracy of the servovalve and adjustment thereof on the test bench.

It is in practice very difficult to obtain optimal results about zero; the improvement of one parameter causing necessarily the deterioration of another. For example, improving the accuracy of zero intersection by increasing the travel path of the valve-spool results in a degradation of the dynamic performances.

However, in accordance with the teaching of the invention, a modification of the shape of the ports in association with the electronic matching circuit, allows a better accuracy of the intersection at zero to be obtained in addition to the desired linearization of the device. For this, the shape of the ports departs from the usual rectangular shape.

FIG. 7 shows a top view of such a non rectangular port 75. On the drive side 84 it has a very fine section of the order of a few hundredths of a millimeter, then it widens gradually towards a conventional rectangular shape. Ideally, the curve would be exponential but, for convenience in manufacture, it is traced in two circles having centers 80,82 and a common tangent about halfway between point 84 and the rectangular part 75. To pierce such ports in the sleeve, an electro-erosion process is used with a set of electrodes which approach successively the desired shape. With this shape, such as shown in FIG. 7, or a closely related shape, it will be noted that the first part of the port to be uncovered, 84, gives a finer control about zero at the same time as a good dynamic response, that is to say that with the section of the ports increasing with the direction of movement of the valve-spool, equal movements of fixed magnitude about zero control oil flows of a volume less than those which would be controlled far from zero.

With the preceding description, the remarkable effects provided by the invention will be better understood, which effects have been mentioned above. Thus the reduction of drive flatness. It is known that in the prior art, whatever the hydraulic motor used with a servovalve flow, the pressure in the user orifices 65,66 (FIG. 6) cannot be determined when the valve-spool 68 is opposite port 75,76, which position is called "about zero". This pressure is in fact related to the level of the hydraulic leaks depending on manufacturing accuracy and on the surface states of the valve-spool/sleeve assembly: accuracy in the diameter of the valve-spool, accuracy in the diameter of the bore of the sleeve, functional tolerance in the valve-spool/sleeve fitting, accuracy in the position of the longitudinal ridge of the valve-spool facing the ridge of the sleeve—called "Intersection at zero".

At present, so as to have a reduction of the "drive flatness" covering and uncovering of the port ridges facing the valve-spool ridges must be obtained at the pressure 70 and return 72 orifices. Covering over the return orifices 72 and uncovering the pressure orifice 70 causes a very high pressure in the user orifice 65,66. Conversely, uncovering return orifice 72 and covering over pressure orifice 70 causes a very low pressure.

Depending on the type of hydraulic motor, the user pressure is either low or high. If the pressure is high the internal friction of the motor will be high and dependent on the mechanical constructional characteristics of the motor (manufacturing tolerances, deformation of the constructional elements etc . . . ). A certain initial pressure, causing rotation of the motor, is then necessary so as to "unstick" the moving parts.

This initial pressure, called "Stick-slip" must overcome the frictional forces between parts and allow the motor to rotate, while responding more rapidly to the electric control signal of the servovalve. In fact, the motor cannot rotate before its parts are unstuck. On the other hand, in accordance with the invention, this transitory period or unsticking of the parts is not ensured, or drive flatness, is reduced, resulting from the reduction of the influence of friction and there is an improvement in controlling the pressure about zero. By thus influencing the unsticking pressure, the motor is brought better under control at low speeds.

The hydraulic leaks are reduced because the section of the ports about zero, the facing valve-spool/port ridges, is considerably reduced.

The reduction of the intrinsic drift due to the distributor alone results from the fact that, in accordance with the invention, the valve-spool has necessarily a longer travel path for the same flowrate in the known art. Thus, poor positioning of the valve-spool has less influence on the drifts of the characteristics of the servovalve, since its travel path is higher about zero.

In so far as improvement in the smoothness of the low speeds of the servo-motor is concerned, it will be noted that with conventional servovalves the instability of the valve-spool causes instability of the pressures and flowrates about zero and so causes unevennesses in the speed of the motor. In accordance with the invention, there is a pressure gain so the pressure and flowrate variations about zero are much better dominated and consequently the movement is stabler and smoother at low speeds.

The improvement in the capacity of the servovalve to respond to a smaller control signal and the possibility of having response performances on demand, which capacity 13 called "resolution" is obtained about zero, i.e. for a small electric signal, since the travel path of the valve-spool is greater for bringing small flowrates under control. The response performances may be on demand since they may be established according to the law(s) of the electric control signal associated or not with the laws of the shapes of ports 75,76.

The possibility of increasing the manufacturing tolerances for the servovalve for a given linearity results from the fact that the electronic matching circuit allows the defects of present manufacturing to be brought better under control and improves the performances of present servovalves which are related to the quality and accuracy of manufacture and more especially of the valve-spool/sleeve assembly. Conversely, to linearize the servovalve with higher imposed tolerances than those possible without the matching circuit is more significant and it is possible to obtain extreme resolution by associating the narrowing of the manufacturing tolerances with a matching circuit whose performances are only limited by the present technical possibilities.

The reduction of the effects of erosion follows from the reduction of the perimeter of the ridges of the valve spool and of the sleeve in contact with the passage of the hydraulic pressurized oil transporting the erosive particles.

Thus, an electrohydraulic servovalve device has been described whose performances are greatly improved with respect to those of devices of the prior art, by introducing into the device a so-called matching electronic circuit controlling the servovalve used, which further allows certain modifications to be made to certain mechanical characteristics of the servovalve, further contributing to improving the performances of the device.

What is claimed is:

1. An electrohydraulic servovalve assembly comprising:

a hydraulic servovalve providing a hydraulic response as a function of a degree of opening of said servovalve;

electric servovalve control means responsive to an electric control signal for controlling said degree of opening of said servovalve as a function of the magnitude and sense of said electric control signal, whereby a degree of opening of said servovalve in response to control signals of given magnitudes over the entire range of opening positions of said servovalve defines an actual response curve for said hydraulic response;

sensor means for sensing an actual servovalve hydraulic response in said actual response curve and outputting an actual response signal;

input means for providing an input signal corresponding to a desired servovalve response; and electric matching means preprogrammed with an ideal response curve of said hydraulic servovalve and receiving said input and actual response signals, said matching means being constructed so as to output a control signal to said control means of such a sense and magnitude that said actual response curve substantially matches said ideal response curve over said entire actual response for any actual response curve.

2. The servovalve assembly as claimed in claim 1, wherein said actual response curve is linear.

3. The servovalve assembly as claimed in one of claims 1 and 2, wherein the servovalve has a valve spool movable in response to said servovalve control means and ports of a shape such that they are gradually uncovered during movement of the valve-spool for optimally adjusting an oil flow rate past said ports about a zero control position.

4. The servovalve assembly as claimed in claim 3, wherein said ports have a variable dimension transverse to a direction of valve-spool movement, whereby between a movement increment of the valve-spool of the servovalve and an increment of the uncovering of a port there exists a generally exponential relationship.

5. The servovalve assembly as claimed in claim 4, wherein said variable dimension is approximated by a circle defined by two arcs having a common tangent at a point about half-way in a path of said circle.

6. The servovalve assembly as claimed in claim 1, wherein said electronic matching means comprise a buffer amplifier followed in order by an analog-digital converter, a memory, a digital-analog converter and a second buffer amplifier.

7. The servovalve assembly as claimed in claim 6, wherein said memory is a programmable memory.

8. The servovalve assembly as claimed in claim 6, wherein said electric matching means comprise a device for detecting the direction of variation of a signal from said memory, and an additional addressing bit.

* * * * *